United States Patent
Abrami et al.

(10) Patent No.: US 7,470,755 B2
(45) Date of Patent: Dec. 30, 2008

(54) POLYEPOXIDE, AMINE AND MERCAPTAN-TERMINATED POLYOXYALKYLENE

(75) Inventors: Siamanto Abrami, Glendale, CA (US); Jorge Camargo, Glendale, CA (US)

(73) Assignee: PRC-DeSoto International, Inc., Glendale, CA (US)

( * ) Notice: Subject to any disclaimer, the term of this patent is extended or adjusted under 35 U.S.C. 154(b) by 436 days.

(21) Appl. No.: 11/289,132

(22) Filed: Nov. 29, 2005

(65) Prior Publication Data

US 2007/0123664 A1    May 31, 2007

(51) Int. Cl.
*B05D 3/00* (2006.01)
*B32B 15/08* (2006.01)
*C08K 3/18* (2006.01)
*C08K 3/34* (2006.01)
*C08K 3/36* (2006.01)
*C08L 63/02* (2006.01)
*C08L 63/04* (2006.01)

(52) U.S. Cl. ........................ 525/523; 427/331; 428/413; 428/418; 523/458; 523/466; 523/467; 525/113; 525/438; 525/454; 525/524; 525/525; 525/528; 525/531; 525/533

(58) Field of Classification Search ................. None
See application file for complete search history.

(56) References Cited

U.S. PATENT DOCUMENTS

| | | | |
|---|---|---|---|
| 3,258,495 A | 6/1966 | LeFave et al. | 260/609 |
| 3,278,496 A | 10/1966 | LeFave et al. | 260/79 |
| 4,591,522 A | 5/1986 | Kang et al. | 428/419 |
| 4,623,702 A * | 11/1986 | Grieves et al. | 525/528 |
| 4,882,216 A * | 11/1989 | Takimoto et al. | 428/209 |
| 5,128,424 A * | 7/1992 | McGinnis et al. | 525/481 |
| 5,214,098 A * | 5/1993 | Setiabudi et al. | 525/109 |
| 5,959,071 A | 9/1999 | DeMoss et al. | 528/378 |
| 6,172,179 B1 | 1/2001 | Zook et al. | 528/373 |
| 6,548,617 B2 | 4/2003 | van den Berg et al. | 528/73 |
| 6,810,187 B2 | 10/2004 | Fabian et al. | 385/128 |
| 6,818,680 B2 | 11/2004 | Shustack | 522/134 |
| 6,862,392 B2 | 3/2005 | Fabian et al. | 385/128 |

OTHER PUBLICATIONS

Cognis, Polymers Coatings & Inks, Capcure® 3-800, Jun. 13, 2005, 30 pages.

* cited by examiner

*Primary Examiner*—Robert Sellers
(74) *Attorney, Agent, or Firm*—Donald R. Palladino

(57) ABSTRACT

Multi-component epoxy-amine primer systems are disclosed, which include an epoxy component and an amine component that includes a mercaptan terminated material. At least one of the epoxy component and the amine component includes a sulfur-containing polymer. Also disclosed are substrates coated with such primer systems as well as methods for coating substrates with such primer systems.

20 Claims, No Drawings

POLYEPOXIDE, AMINE AND MERCAPTAN-TERMINATED POLYOXYALKYLENE

FIELD OF THE INVENTION

The present invention is directed to multi-component epoxy-amine compositions. More particularly, the present invention relates to multi-component compositions comprising an epoxy component comprising a curable resinous polyepoxide, and an amine component comprising an amine and a mercaptan terminated material. At least one of the epoxy component and the amine component comprises a sulfur-containing polymer, such as a polythioether and/or a polysulfide. The present invention is also directed to substrates coated with such compositions and methods for coating substrates with such compositions.

BACKGROUND OF THE INVENTION

Epoxy-amine compositions, including those that contain chromate, are used in the aircraft industry as, for example, primers for paints. Such primers provide an intermediate layer that forms a strong bond with the metallic surface, often aluminum, and provides an outer surface to which topcoats can bond. In addition to adhesion to the topcoat, such primers may also serve to inhibit corrosion of the underlying metal. This corrosion resistance includes the capacity to protect the metal surface covered by the primer as well as the capacity to extend the protection beyond the edge of the primer coating and prevent adjacent uncoated surfaces from corroding. This can be relevant in the aircraft industry due to the various corrosive fluids used, such as jet fuel, brake fluid, and the like. It is also desirable that such primers have sufficient flexibility to withstand the severe cold to which aircraft are exposed. Impact resistance is also desirable and again relevant in light of the noise and vibration to which aircraft are subjected. In addition, it also desirable, at least in some instances, that such primers resist blushing and cure relatively quickly at cold temperatures.

SUMMARY OF THE INVENTION

In certain respects, the present invention is directed to multi-component epoxy-amine compositions, such as primers, comprising (a) an epoxy component comprising a curable resinous polyepoxide, and (b) an amine component comprising (i) an amine, and (ii) a mercaptan terminated material having a structure according to the formula:

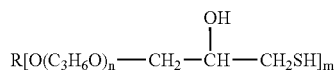

wherein R is an aliphatic hydrocarbon, n is 1 to 100, and m is at least 3. In such epoxy-amine compositions at least one of the epoxy component and the amine component comprises a sulfur-containing polymer, such as those having sulfur present as polysulfide or as polythioether linkages in the polymeric backbone.

The present invention is also directed to substrates at least partially coated with such compositions as well as methods for coating substrates with such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. For example, and without limitation, this application refers to compositions that include a "curable resinous polyepoxide." Such references to a "curable resinous polyepoxide" is meant to encompass compositions comprising one curable resinous polyepoxide as well as compositions that comprise a mixture of two or more such epoxides. In addition, in this application, the use of "or" means "and/or" unless specifically stated otherwise, even though "and/or" may be explicitly used in certain instances.

The present invention is directed to multi-component epoxy-amine compositions comprising (i) an epoxy component comprising a curable resinous polyepoxide, and (ii) an amine component comprising an amine and mercaptan terminated material. As used herein, the term "multi-component" refers to compositions that include more than one component, such as those that include two components, wherein the components are stored separately and then mixed at or near the time of use. In certain embodiments, the compositions of the present invention are embodied as a multi-component epoxy-amine primer system. As used herein, the term "primer system" refers to compositions suitable for use as an intermediate layer that can form a bond with a metallic substrate, such as aluminum, and can provide an outer surface to which topcoats can bond.

The multi-component epoxy-amine compositions of the present invention comprise an epoxy component, which comprises a curable resinous polyepoxide. As used herein, the term "curable" refers to the capability of a compound to undergo one or more chemical reactions to form stable, covalent bonds among the constituent components. Suitable resinous polyepoxides that may be used in the compositions of the present invention include diglycidyl ethers of bisphenol A, diglycidyl ethers of bisphenol F, glycidyl ethers of bisphenol, epoxylated novolacs, and the like. In some cases, such a curable resinous polyepoxide has a molecular weight of 250 to 1500, such as 300 to 550. Such resinous polyepoxides can be prepared by the reaction of epichlorohydrin with a polyhydric organic compound, or can be purchased, for example, from Resolution Products, in their EPON line of products, or Ciba Specialty Chemicals in their ARALDITE line of products. The curable resinous polyepoxide should be chosen to give the epoxy component the desired viscosity without the need for high VOC level and also any other desired properties, such as flexibility.

In certain embodiments, the epoxy component comprises a curable resinous polyepoxide comprising a sulfur-containing polymer, such as a sulfur-containing polymer having sulfur present as polysulfide linkages (a linkage of two or more atoms of sulfur, i.e., (—S—S—)$_p$, wherein p is at least 1), and/or as polythioether linkages (—S—) in the polymeric backbone, such as an epoxy terminated polysulfide and/or polythioether. As used herein, the term "sulfur-containing polymer" refers to polymers comprising at least one sulfur atom.

Epoxy terminated polysulfides that are suitable for use in the present invention, include, for example, commercially available products, such as the Thioplast™ EPS line of products commercially available from Akzo Nobel. Specific examples of suitable commercially available epoxy terminated polysulfides include, without limitation, Thioplast™ EPS 15, EPS 25, EPS 70, and EPS 350.

Epoxy terminated polythioethers that are suitable for use in the present invention include, for example, epoxy terminated polythioethers that include a structure having the formula:

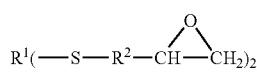

wherein R$^1$ denotes a C$_{2-6}$ n-alkylene, C$_{3-6}$ branched alkylene, C$_{6-8}$ cycloalkylene or C$_{6-10}$ alkylcycloalkylene group, —[—CHR$^3$)$_p$—X—]$_q$(CHR$^3$)$_r$—, wherein each R$^3$ is independently selected from H and CH$_3$, p is an integer from 2 to 6, q is an integer from 1 to 5, r is an integer from 2 to 10, and X is independently selected from O, S, —NH— and —NR$^4$—, wherein R$^4$ is hydrogen or methyl; and R$^2$ is a divalent linking group.

Examples of such polythioethers as well as methods for their production are described in U.S. Patent Application Publication No. 2005/0010003 at [0022] to [0056], the cited portion of which being incorporated herein by reference. An example of commercially available epoxy terminated polythioethers, which is suitable for use in the present invention, is Permapol® 5534 from PRC-Desoto International, Inc., Glendale, Calif.

In certain embodiments, the epoxy component also comprises a liquid vehicle, such as an organic solvent. Suitable organic solvents include ketones, esters, aromatic solvents, butylacetate and isopropyl alcohol, OXSOL 100, xylene, butanol, and the like. In certain embodiments, the curable resinous polyepoxide comprises from 10 to 30 weight percent of the epoxy component, such as 20 weight percent, and 90 to 70 weight percent solvent and/or other components, with weight percent being based on the total weight of the epoxy component. In certain embodiments, the solvent content of the epoxy component is no more than 60 weight percent, with weight percent being based on the total weight of the epoxy component.

If desired, other resins may be included within the epoxy component of the epoxy-amine primer systems of the present invention. In certain embodiments, for example, the epoxy component further comprises "standard" epoxy materials, such as those available from Resolutia in their EPON line of products; such epoxies may, in certain embodiments, comprise 10 to 50 weight percent of the epoxy component.

As mentioned previously, the multi-component epoxy-amine compositions of the present invention comprise an amine component, which comprises an amine and a mercaptan terminated material. Suitable amines include primary, secondary, and tertiary amines, including, for example, those materials that contain a plurality of, i.e., at least two, amino hydrogen atoms. Numerous amines are suitable, such as aliphatic and cycloaliphatic amines; such as diethylene triamine and triethylene tetraamine. Aromatic amines, such as methylene dianiline, can also be used as can amidoamines or polyamides.

In certain embodiments, the amine component comprises a polyamine, such as primary or secondary diamines or polyamines, wherein the radicals attached to the nitrogen atoms can be saturated or unsaturated, aliphatic, alicyclic, aromatic, aromatic-substituted aliphatic, aliphatic-substituted aromatic, or heterocyclic. In certain embodiments, the polyamine includes mixed amines in which the radicals are different, such as, for example, aromatic groups, aliphatic groups, and other non-reactive groups attached to the carbon atoms, such as oxygen, sulfur, halogen, or nitro groups. Examples of suitable aliphatic and alicyclic diamines include 1,2-ethylene diamine, 1,2-propylene diamine, 1,8-p-methane diamine, isophorone diamine, propane-2,2-cyclohexyl amine, and methane-bis-(4-cyclohexyl amine), and

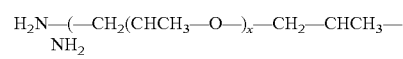

wherein x is from 1 to 10.

In certain embodiments, the polyamine includes phenylene diamines and toluene diamines, such as, for example, o-phenylene diamine and p-tolylene diamine, and N-alkyl and N-aryl derivatives thereof, such as, for example, N,N'-dimethyl-o-phenylene diamine, N,N'-di-p-tolyl-m-phenylene diamine, and p-amino-diphenylamine.

In certain embodiments, the polyamine may be a polynuclear aromatic diamine in which the aromatic rings are attached by means of a valence bond, such as, for example, 4,4'-biphenyl diamine, methylene dianiline, and monochloromethylene dianiline.

In certain embodiments, the amine comprises from 0.1 to 50 weight percent of the amine component; such as 1 to 50 weight percent, with weight percent being based on the total weight of the amine component.

As previously indicated, the amine component of the compositions of the present invention also comprises a mercaptan terminated material having a structure according to the formula:

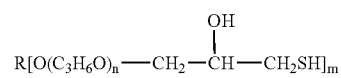

wherein R is an aliphatic hydrocarbon, n is 1 to 100, and m is at least 3. Such materials can be prepared from the reaction of polyoxyalkylene polyols with epichlorohydrin and subsequently with a sulfur-containing reactant as described, for example, in U.S. Pat. Nos. 3,278,496 and 3,258,495, the relevant disclosure of which being incorporated herein by reference. Suitable mercaptan terminated materials of the type described above are commercially available from Cognis Corp., Cincinnati, Ohio under the CAPCURE® product line, such as CAPCURE® 3-800, CAPCURE® LDF, CAPCURE® 3830-81, CAPCURE® 3850-81, and CAPCURE® 40 SEC HV.

In certain embodiments, the mercaptan terminated material described above comprises from 10 to 90 weight percent of amine component; such as 40 to 90 weight percent, with weight percent being based on the total weight of the amine component.

In certain embodiments, the amine component comprises a sulfur-containing polymer, such as a sulfur-containing polymer having sulfur present in the polymer backbone as polysulfide linkages and/or as polythioether linkages. In certain embodiments, such a sulfur-containing polymer has functional groups reactive with the functional groups of the curable resinous polyepoxide in the epoxy component, such as, for example, amine groups and/or mercaptan groups.

Suitable mercaptan terminated polysulfides, which are suitable for use in the present invention, include commercially available products, such as those available under the Thioplast™ tradename from Akzo Nobel.

Suitable amine and/or mercaptan terminated polythioethers, include, for example, amine and/or mercaptan terminated polythioethers that include a structure having the formula:

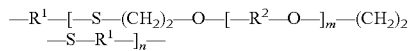

wherein $R^1$ denotes a $C_{2-6}$ n-alkylene, $C_{3-6}$ branched alkylene, $C_{6-8}$ cycloalkylene or $C_{6-10}$ alkylcycloalkylene group, —[(—CH$_2$—)$_p$—X—]$_q$—(—CH$_2$—)$_r$—, or —[(—CH$_2$—)$_p$—X—]$_q$—(—CH$_2$—)$_r$—, wherein at least one —CH$_2$— unit is substituted with a methyl group; $R^2$ denotes a $C_{2-6}$ n-alkylene group, a $C_{2-6}$ branched alkylene group, a $C_{6-8}$ cycloalkylene group, a $C_{6-10}$ alkylcycloalkylene group, —[(—CH$_2$—)$_p$—X—]$_q$—(—CH$_2$—)$_r$—; X is selected from O, S, and —NR—, wherein R is hydrogen or methyl; m is a rational number from 0 to 10; n is an integer from 1 to 60; p is an integer from 2 to 6; q is an integer from 1 to 5; and r is an integer from 2 to 10.

Such polythioethers can, for example, be prepared by reacting reactants comprising (i) one or more polythiol materials, and (ii) one or more polyvinyl ether materials according to the methods described in U.S. Pat. No. 6,172,179 at col. 8, line 62 to col. 12, line 22, the cited portion of which being incorporated herein by reference. Examples of such polythioethers, which are commercially available, include Permapol® P3.1 E from PRC-Desoto International, Inc., Glendale, Calif.

In certain embodiments, the sulfur-containing polymer having sulfur present in the polymer backbone comprises from 1 to 30 weight percent of the amine component; such as 1 to 20 weight percent, with weight percent being based on the total weight of the amine component.

In certain embodiments, the amine component also comprises a liquid vehicle, such as an organic solvent, such as those listed earlier with respect to the epoxy component. In certain embodiments, the liquid vehicle comprises up to 60 weight percent of the amine component, based on the total weight of the amine component.

In certain embodiments, the amine component may also comprise other materials that can react with the curable resinous polyepoxide of the epoxy component. Examples of such materials include polyacids, polyanhydrides, and polythiols other than the polysulfide and/or polythioether polymers described earlier. As used herein, the term "polyacid" refers to compounds having at least two reactive acid groups per molecule. The acid functionality can be a carboxylic acid or a sulfonic acid. In certain embodiments, the polyacid comprises a carboxyl-terminated compound having at least two carboxyl groups per molecule. Examples of suitable polyacids include carboxylic acid group-containing polymers, such as acrylic polymers, polyesters, and polyurethanes; and oligomers, such as ester group-containing oligomers and monomers.

Examples of carboxylic acid-containing acrylic polymers are copolymers of (a) an ethylenically unsaturated monomer containing at least one carboxylic acid group, and (b) a different ethylenically unsaturated monomer that is free from carboxylic acid groups. In certain embodiments, the amounts of monomer (a) and monomer (b) are selected such that the acid number of the polyacid acrylic polymer is from 30 to 150, such as 60 to 120. Examples of carboxylic acid-containing acrylic monomers are acrylic acid, methacrylic acid, maleic acid, and partial esters of maleic acid. The other monomeric component (b) is characterized by the group,

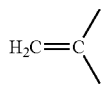

and may be styrene, an alpha-substituted lower alkyl styrene, such as alpha-methylstyrene, an alkyl ester of acrylic or methacrylic acid, such as methyl methacrylate, methyl acrylate, and ethyl acrylate, and mixtures thereof.

In certain embodiments, the polyacid may comprise a monomeric polycarboxylic acid having from 5 to 20 carbon atoms, such as open chain, cyclic, saturated, unsaturated, and aromatic acids. Examples of suitable monomeric polycarboxylic acids include succinic acid, adipic acid, azelaic acid, sebacic acid, hexahydrophthalic acid, maleic acid, cyclohexene-1,2-dicarboxylic acid, and phthalic acid.

As previously indicated, in the multi-component epoxy-amine compositions of the present invention, the amine component and the epoxy component are mixed at or near the time of use. In certain embodiments, the mixture has a useful life of several hours before it becomes too viscous to apply. In certain embodiments, the epoxy-amine compositions of the present invention comprise the amine component and epoxy component in a one-to-one volume ratio, or in a ratio of from 0.8:1 to 1.5:1.

In certain embodiments, either or both of the epoxy component and the amine component further comprise a corrosion inhibitor. Suitable corrosion inhibitors include inorganic, finely divided chromate pigments, such as calcium chromate, strontium chromate, red chromate, zinc chromate, magnesium chromate, and barium chromate, alone or in combination. If added to the amine component and/or epoxy component, the corrosion inhibitor is typically present in an amount of 5 to 50 weight percent of the composition.

In certain embodiments, either or both of the epoxy component and the amine component further comprise one or more siliceous materials, such as, for example, silica, clay, such as bentone clay, talc, and the like. The average particle size of the siliceous material varies depending on the material chosen, but typically ranges from 0.01 to 20 microns. In other embodiments, one or more siliceous materials are used, wherein one or more of these materials have been pre-reacted with a polyalkoxysilane or siloxane having at least one active hydrogen atom that is reactive with the epoxy group of the resinous polyepoxide. If added to the epoxy component, the siliceous material(s) are, in certain embodiments, present in an amount of 2 to 20 weight percent, based on the total weight of the epoxy component; if added to the amine component, the siliceous material(s) are, in certain embodiments, present in an amount of 2 to 20 weight percent, based on the total weight of the amine component.

If desired, other additives can be included in either or both of the amine component and the epoxy component, including plasticizers, fillers and pigments, cure accelerators, adhesion promoters, thixotropic agents, fire retardants, masking agents, antioxidants, surfactants, and other additives known to those skilled in the art. When used, these additives may, in certain embodiments, comprise 0.1 to 50 weight percent of the epoxy and/or amine component. Suitable plasticizers include, for example, phthalate esters, chlorinated paraffins, and hydrogenated terphenyls. Examples of useful plasticizers include HB-40® modified polyphenyl (Solutia, Inc.) and tung oil (Campbell & Co.). In certain embodiments, the plasticizer comprises 1 to 40 weight percent, such as 1 to 8 weight percent, based on the total weight of the composition.

The compositions of the present invention can be applied to any suitable substrate by any suitable method. In certain embodiments, the composition is embodied as a sprayable coating that may be particularly suitable for metal substrates, particularly aluminum. The present invention, therefore, is also directed to substrates at least partially coated with a composition of the present invention. Moreover, the present invention is directed to methods for coating a substrate with a composition of the present invention, which methods comprise the steps of applying the composition to the substrate, coalescing the composition over the substrate in the form of a substantially continuous film, and curing the composition. In other embodiments, the compositions of the present invention may be embodied as an adhesive and/or sealant.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Preparation of Multi-Component Epoxy-Amine Composition

A multi-component epoxy-amine composition was prepared from an epoxy component and an amine component as follows.

Preparation of Epoxy Component

A mixture of 60 parts by weight of Epon™ 828 epoxy resin (from Hexion Specialty Chemicals), 20 parts by weight of Heloxy™ 505 polyepoxide (from Hexion Specialty Chemicals), and 20 parts by weight Heloxy™ 8 aliphatic monoglycidyl ether (from Hexion Specialty Chemicals) was prepared by mixing the components in a suitable vessel.

Preparation of Amine Component

A mixture of 80 parts by weight Capcure® LDF (from Cognis Corp., Cincinnati, Ohio), 16 parts by weight Permapol® P3.1 E (from PRC-Desoto International, Inc., Glendale, Calif.), 2 parts by weight Ancamine® K-54 tertiary amine accelerator (from Air Products & Chemicals, Allentown, Pa.), and 2 parts by weight caprolactone was prepared by mixing the components in a suitable vessel.

Example 2

Preparation of Multi-Component Epoxy-Amine Composition

A multi-component epoxy-amine composition was prepared from an epoxy component and an amine component as follows.

Preparation of Epoxy Component

A mixture of 30 parts by weight of Epon™ 828 epoxy resin (from Hexion Specialty Chemicals), 30 parts by weight D.E.N. 431 novolac epoxy resin (from Hexion Specialty Chemicals), 25 parts by weight of Heloxy™ 505 polyepoxide (from Hexion Specialty Chemicals), and 15 parts by weight Heloxy™ 8 aliphatic monoglycidyl ether (from Hexion Specialty Chemicals) was prepared by mixing the components in a suitable vessel.

Preparation of Amine Component

A mixture of 10 parts by weight Capcure® 3830-8 (from Cognis Corp., Cincinnati, Ohio), 52 parts by weight Capcure® 3-800 (from Cognis Corp., Cincinnati, Ohio), 30 parts by weight Permapol® P3.1 E (from PRC-Desoto International, Inc., Glendale, Calif.), and 8 parts by weight caprolactone was prepared by mixing the components in a suitable vessel.

Example 3

Preparation of Multi-Component Epoxy-Amine Composition

A multi-component epoxy-amine composition was prepared from an epoxy component and an amine component as follows.

Preparation of Epoxy Component

A mixture of 60 parts by weight of Epon™ 828 epoxy resin (from Hexion Specialty Chemicals), 20 parts by weight Permapol® 5534, and 20 parts by weight Cardura E-10P (from Hexion Specialty Chemicals) was prepared by mixing the components in a suitable vessel.

Preparation of Amine Component

A mixture of 8 parts by weight Capcure® 3830-81 (from Cognis Corp., Cincinnati, Ohio), 84 parts by weight Capcure® 3-800 (from Cognis Corp., Cincinnati, Ohio), and 8 parts by weight caprolactone was prepared by mixing the components in a suitable vessel.

Example 4

Preparation of Multi-Component Epoxy-Amine Composition

A multi-component epoxy-amine composition was prepared from an epoxy component and an amine component as follows.

Preparation of Epoxy Component

A mixture of 60 parts by weight of Epon™ 828 epoxy resin (from Hexion Specialty Chemicals), 20 parts by weight Thioplast EPS 25™ from Akzo Nobel), and 20 parts by weight Cardura E-10P (from Hexion Specialty Chemicals) was prepared by mixing the components in a suitable vessel.

Preparation of Amine Component

A mixture of 6 parts by weight Capcure® 3830-81 (from Cognis Corp., Cincinnati, Ohio), 58 parts by weight Capcure® 3-800 (from Cognis Corp., Cincinnati, Ohio), 28 parts by weight Thioplast G4 (from Akzo Nobel), and 8 parts by weight caprolactone was prepared by mixing the components in a suitable vessel.

Examples 5-8

Application of Composition to a Test Substrate

The epoxy and amine components prepared in each Example 2-4 were mixed together and tested for tensile strength and elongation, with results being reported in the Table below.

| Composition | Tensile (psi)[1] | Elongation (%)[1] |
|---|---|---|
| Example 2 | 222[2] | 329.4[2] |
| Example 3 | 183[3] | 63.0[3] |
| Example 4 | 161[4] | 64.2[4] |

[1] Tensile strength and elongation were measured at various conditions in accordance with the procedure described in AMS 3265B, § 3.6.20, test procedure AS5127/1, § 7.7.
[2] Reported value is an average of four measurements with film thicknesses ranging from 0.0695 to 0.0710 inches.
[3] Reported value is an average of four measurements with film thicknesses ranging from 0.0695 to 0.0755 inches.
[4] Reported value is an average of four measurements with film thicknesses ranging from 0.0685 to 0.0710 inches.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A multi-component composition comprising:
   (a) an epoxy component comprising a resin consisting of a curable resinous polyepoxide and, optionally, another epoxy resin, and
   (b) an amine component comprising:
      (i) an amine, and
      (ii) a mercaptan terminated material having a structure according to the formula:

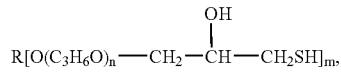

wherein R is an aliphatic hydrocarbon, n is 1 to 100, and m is at least 3,
wherein the amine component comprises a polythioether.

2. The composition of claim 1, wherein the curable resinous polyepoxide has a molecular weight of 250 to 1500.

3. The composition of claim 1, wherein the curable resinous epoxide comprises from 10 to 30 weight percent of the epoxy component.

4. The composition of claim 1, wherein the epoxy component comprises a curable resinous polyepoxide comprising a sulfur-containing polymer having sulfur present as polysulfide linkages and/or as polythioether linkages in the polymeric backbone.

5. The composition of claim 4, wherein the curable resinous polyepoxide comprises an epoxy terminated polythioether that includes a structure having the formula:

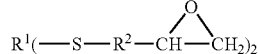

wherein $R^1$ denotes a $C_{2-6}$ n-alkylene, $C_{3-6}$ branched alkylene, $C_{6-8}$ cycloalkylene or $C_{6-10}$ alkylcycloalkylene group, $—[—CHR^3—]_p—X—]_q(CHR^3)_r—$, wherein each $R^3$ is independently selected from H and $CH_3$, p is an integer from 2 to 6, q is an integer from 1 to 5, r is an integer from 2 to 10, and X is independently selected from O, S, —NH— and —NR$^4$—, wherein $R^4$ is hydrogen or methyl; and $R^2$ is a divalent linking group.

6. The composition of claim 1, wherein the amine comprises a diamine.

7. The composition of claim 6, wherein the diamine is selected from 1,2-ethylene diamine, 1,2-propylene diamine, 1,8-p-menthane diamine, isophorone diamine, propane-2,2-cyclohexyl amine, and methane-bis-(4-cyclohexyl amine), or

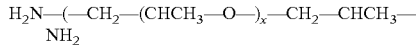

wherein x is from 1 to 10, including mixtures thereof.

8. The composition of claim 1, wherein the polythioether includes a structure having the formula:

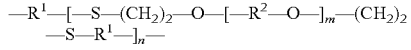

wherein $R^1$ denotes a $C_{2-6}$ n-alkylene, $C_{3-6}$ branched alkylene, $C_{6-8}$ cycloalkylene or $C_{6-10}$ alkylcycloalkylene group, $—[(—CH_2—)_p—X—]_q—(—CH_2—)_r—$, or $—[(—CH_2)_p—X—]_q—(—CH_2—)_r—$, wherein at least one —CH$_2$— unit is substituted with a methyl group; $R^2$ denotes a $C_{2-6}$ n-alkylene group, a $C_{2-6}$ branched alkylene group, a $C_{6-8}$ cycloalkylene group, a $C_{6-10}$ alkylcycloalkylene group, $—[(—CH_2—)_p—X—]_q—(—CH_2—)_r—$; X is selected from O, S, and, —NR—, wherein R is hydrogen or methyl; m is a rational number from 0 to 10; n is an integer from 1 to 60; p is an integer from 2 to 6; q is an integer from 1 to 5; and r is an integer from 2 to 10.

9. The composition of claim 8, wherein the $R^1$ is $-[(-CH_2)_p-X]_q-(-CH_2)_r-$, where p is 2, X is O, q is 2, r is 2, $R^2$ is ethylene, m is 2, and n is 9.

10. The composition of claim 9, wherein m is 3.

11. The composition of claim 1, wherein the amine comprises 0.1 to 50 weight percent of the amine component and the mercaptan terminated material comprises 10 to 90 weight percent of the amine component, with weight percent being based on the total weight of the amine component.

12. The composition of claim 1, wherein at least one of the amine component and the epoxy component further comprise a corrosion inhibitor.

13. The composition of claim 12, wherein the corrosion inhibitor comprises chromate.

14. The composition of claim 1, wherein at least one of the epoxy component and the amine component further comprise a siliceous material selected from silica, clay, or a mixture thereof.

15. A substrate at least partially coated with the composition of claim 1.

16. The substrate of claim 15, wherein the substrate comprises a metal substrate.

17. The substrate of claim 16, wherein the metal substrate comprises aluminum.

18. A method of coating a substrate comprising:
    (a) applying the composition of claim 1 to at least a portion of the substrate,
    (b) coalescing the composition over the substrate in the form of a substantially continuous film, and
    (c) curing the composition.

19. A multi-component composition comprising:
    (a) an epoxy component comprising a curable resinous polyepoxide, and
    (b) an amine component comprising:
        (i) an amine,
        (ii) a mercaptan terminated material having a structure according to the formula:

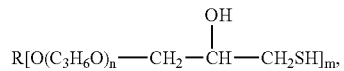

wherein R is an aliphatic hydrocarbon, n is 1 to 100, and m is at least 3, and
        (iii) a polythioether,
   wherein the composition comprises the amine component and the epoxy component in a volume ratio of from 0.8:1 to 1.5:1.

20. The composition of claim 19, wherein the volume ratio is 1:1.

* * * * *